US008952276B2

(12) United States Patent
Lin

(10) Patent No.: US 8,952,276 B2
(45) Date of Patent: Feb. 10, 2015

(54) SUITCASE SCALE CONTAINED WITHIN A BUCKLE HOUSING

(71) Applicant: Chun Ming Lin, Taipei (TW)

(72) Inventor: Chun Ming Lin, Taipei (TW)

( * ) Notice: Subject to any disclaimer, the term of this patent is extended or adjusted under 35 U.S.C. 154(b) by 289 days.

(21) Appl. No.: 13/659,784

(22) Filed: Oct. 24, 2012

(65) Prior Publication Data
US 2014/0102813 A1    Apr. 17, 2014

(30) Foreign Application Priority Data
Oct. 11, 2012  (CN) .......................... 2012 2 0519085

(51) Int. Cl.
   *G01G 19/00*   (2006.01)
   *G01G 19/52*   (2006.01)
   *G01G 19/58*   (2006.01)
   *G01G 21/28*   (2006.01)

(52) U.S. Cl.
   USPC ............................ 177/148; 177/238; 177/245

(58) Field of Classification Search
   USPC ................................. 177/131, 148, 149, 245
   See application file for complete search history.

(56) References Cited

U.S. PATENT DOCUMENTS

| 7,378,604 | B2 * | 5/2008 | Truong | 177/131 |
| 7,550,684 | B2 * | 6/2009 | Kritzler | 177/148 |
| 8,629,357 | B2 * | 1/2014 | Moon | 177/148 |
| 2010/0116559 | A1 * | 5/2010 | Moon | 177/25.13 |
| 2013/0036777 | A1 * | 2/2013 | Lin | 70/30 |

* cited by examiner

*Primary Examiner* — Randy W Gibson

(57) ABSTRACT

A suitcase scale is bundled a suitcase for providing functions of scaling and anti-theft. The suitcase scale comprises a housing, a processing unit disposed in the housing, a weight sensor secured in the housing and electrically connected to the processing unit, a combination lock mounted into the housing, a buckle detachably engaged to the housing and a strap having two opposite ends respectively connected to the buckle and the housing. Consequently, the strap, the buckle and the housing form an endless ring for bundling the suitcase when the combination lock is in a locked condition. The suitcase scale immediately shows the total weight value of the suitcase to prevent the user from paying and excessive baggage charge and provides a function of anti-theft due to the combination lock such that a thief or a pickpocket can not steal the belongings in the locked suitcase.

12 Claims, 8 Drawing Sheets

SUITCASE SCALE CONTAINED WITHIN A BUCKLE HOUSING

BACKGROUND OF THE INVENTION

1. Field of the Invention

The present invention relates to scale, and more particularly to a suitcase scale that previously scales the weight of the suitcase and prevents from paying and excessive baggage charge.

2. Description of Related Art

A traveler usually carries several suitcases with different sizes when going aboard. The size and weight of suitcase are seriously limited in customhouse for flight safe. However, an ordinary family has no suitable scale or weight measure device for suitcase. As a result, the suitcase may have a weight that is over a maximum of allowance such that an excessive baggage charge is necessary. It is a bother for a traveler who wants to go aboard.

Some suitcase manufacturers provide a weight measure device to a roller that is mounted onto an underside of a suitcase for measuring weight of the suitcase. However, the weight measure device is easily broken because the conventional weight measure device always loads the gravity of the suitcase.

The present invention has arisen to mitigate and/or obviate the disadvantages of the conventional method and device for measure the weight of a suitcase.

SUMMARY OF THE INVENTION

The main objective of the present invention is to provide an improved suitcase scale that previously scales the weight of the suitcase and prevents from paying and excessive baggage charge.

To achieve the objective, the suitcase scale in accordance with the present invention comprises a hollow cuboid housing having a first end and a second end. A tunnel is longitudinally defined in the first end and a recess is defined in a panel of the housing near the second end. A trough and a slot respectively are defined in to two opposite sides of the recess. A processing unit is disposed in the housing. The processing unit includes a battery secured on a bottom of the housing. A circuit board is secured in the housing and electrically connected to the battery. A displayer is mounted onto the circuit board and received in the trough. A cover is mounted onto the bottom of the recess for covering the displayer. A window is defined in the cover such that the user can read the datum shown on the display through the window. A weight sensor is secured in the housing and electrically connected to the processing unit. The weight sensor includes a connector extending through the slot and a tab connected to the connector, wherein the tab provides a protection to the window and the displayer when being lowered. A buckle is detachably engaged into the housing. A strap has two opposite ends respectively connected to the buckle and the second end of the housing.

The suitcase scale in accordance with the present invention immediately shows the total weight value of the suitcase on the displayer to prevent the user from paying and excessive baggage charge.

Further benefits and advantages of the present invention will become apparent after a careful reading of the detailed description with appropriate reference to the accompanying drawings.

DETAILED DESCRIPTION OF THE INVENTION

Figure 1:
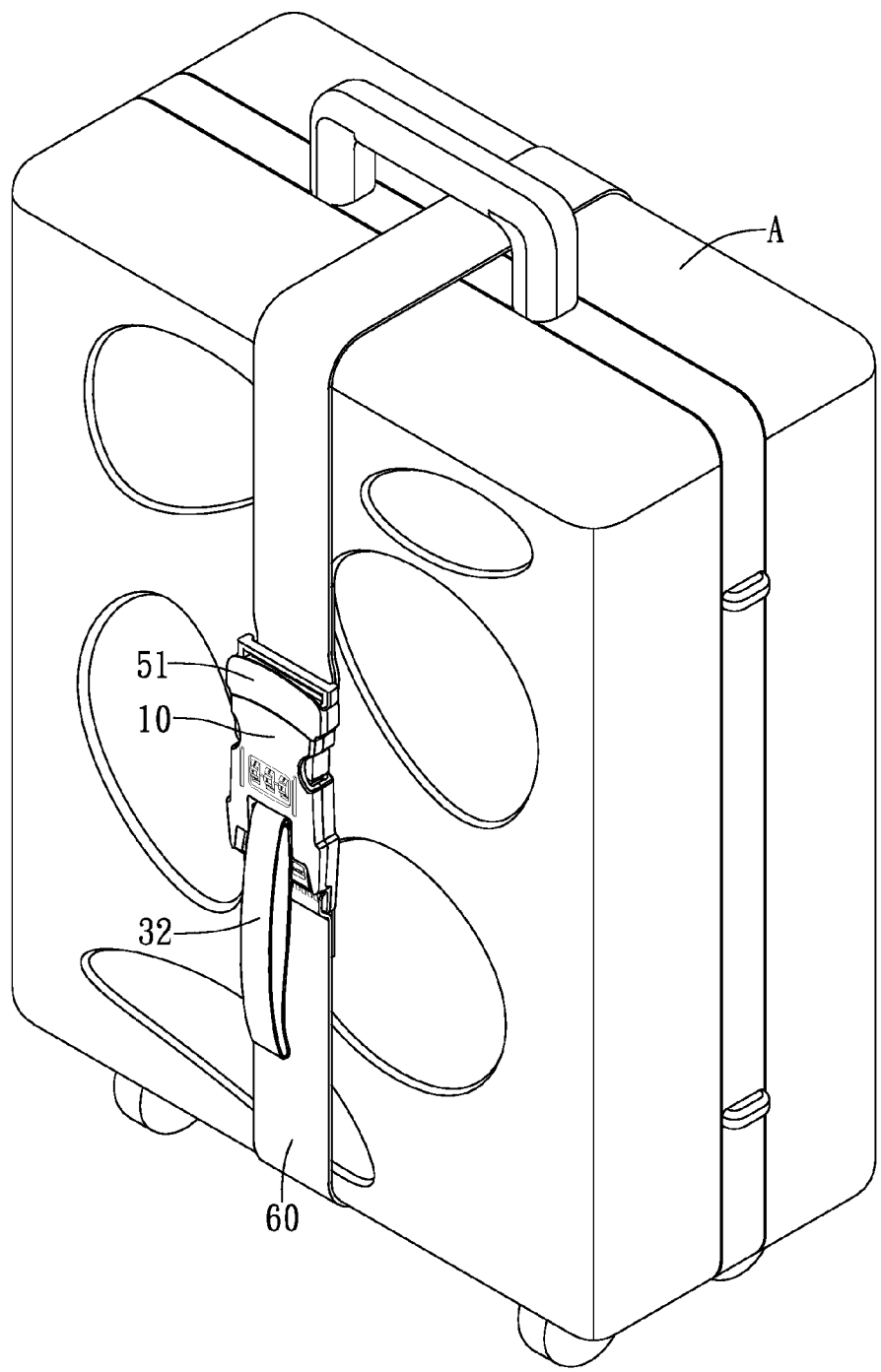
FIG. 1 is a schematic perspective view of a suitcase scale in accordance with the present invention.

Referring to the drawings and initially to FIGS. 1-4, a suitcase scale in accordance with the present invention is bundled a suitcase (A) for providing functions of scaling and anti-theft. The suitcase scale comprises a housing (10), a processing unit (20) disposed in the housing (10), a weight sensor (30) secured in the housing (10) and electrically connected to the processing unit (20), a combination lock (40) mounted into the housing (10), a buckle (50) detachably engaged to the housing (10) and a strap (60) having two opposite ends respectively connected to the buckle (50) and the housing (10). Consequently, the strap (60), the buckle (50) and the housing (10) form an endless ring for bundling the suitcase (A) when the combination lock (40) is in a locked condition.

The housing (10) is a hollow cuboid and has a first end and a second end. A tunnel (11) is longitudinally defined in the first end of the housing (10) and two through holes (12) respectively defined in two opposite sides of the housing (10), wherein the two through holes (12) respectively communicate with the runnel (11). Multiple longitudinal grooves (13) defined in a panel of the housing (10) and a recess (100) is defined in the panel and near the second end of the housing (10). A trough (14) and a slot (15) are respectively defined in two opposite sides of a bottom of the recess (100). A longitudinal trough (16) is defined in a bottom of the first end of the housing (10) and a spring (161) is compressively received in the longitudinal trough (16).

The processing unit (20) includes a battery (21) secured on a bottom of the housing (10). A circuit board (22) is secured in the housing (10) and electrically connected to the battery (21). A displayer (221) is mounted onto the circuit board (22) and received in the trough (14). A cover (23) is mounted onto the bottom of the recess (100) for covering the displayer (221). A window (231) is defined in the cover (23) such that the user can read the datum shown on the displayer (221) through the window (231).

In the preferred embodiment of the present invention, the weight sensor (30) is a strain gauge and has a connector (31) extending through the slot (15). A tab (32) is connected to the connector (231).

The combination lock (40) includes a lock core (41) rotatably mounted onto the bottom of the housing (10) and a latch (42) slidably mounted onto the bottom of the housing (10). The lock core (41) includes multiple rotors (411) sequentially co-axially and rotatably connected to one another and each rotor (411) partially extends through a corresponding one of the longitudinal grooves (13) for user to easily rotate the rotors (411). Multiple indicating zones (412) are formed on a periphery of each of the rotors (411). Each indicating zone (412) is marked a number and the numbers are different from one another. Each rotor (411) has a shaft (413) centrally extending therefrom and having a groove (414) radially defined in the shaft (413) of each of the rotors (411), wherein each groove (414) corresponds to a number.

The latch (42) is formed with a slider (421) slidably received in the longitudinal trough (16). One end of the slider (421) abuts against the spring (161) such the latch (42) is reciprocally moved relative to the housing (10) and the spring (161) pushes the latch (42) toward the first end of the housing (10) when the latch (42) is in a free condition. The latch (42) includes two opposite sides each having a tapered first guide plane (422) formed thereon. Multiple protrusions (423) extend from a distal edge of the latch (42) toward the lock core (41) and each protrusion (423) radially points to a corresponding one of the shaft (413). The distal end of each of the protrusions (423) is selectively received in the groove (414) in the corresponding shaft (413).

The buckle (50) is formed with a handle (51) selectively abutting against the first end of the housing (10). Two parallel resilient plates (52) respectively extend from one side of the handle (51). An enlarged head (53) is formed on a free end of each of the two resilient plates (53). Each enlarged head (53) is engaged to a corresponding one of the two through holes (12) after being inserted into the tunnel (11) such that the buckle (50) does not detach from the housing (10). Each enlarged head (53) is formed with a tapered second guide plane (531). Each second guide plane (531) abuts a corresponding one of the two first guide plane (422).

Figure 2:
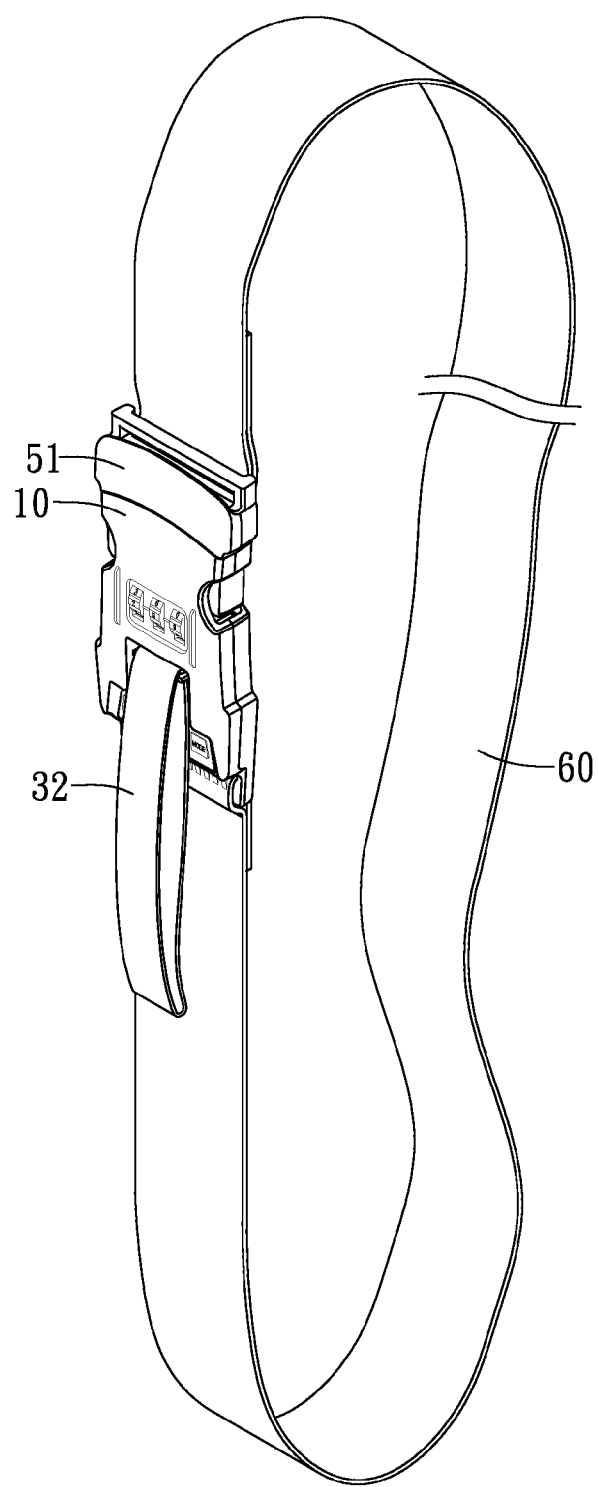
FIG. 2 is a perspective view of the suitcase scale in accordance with the present invention.
Figure 5:
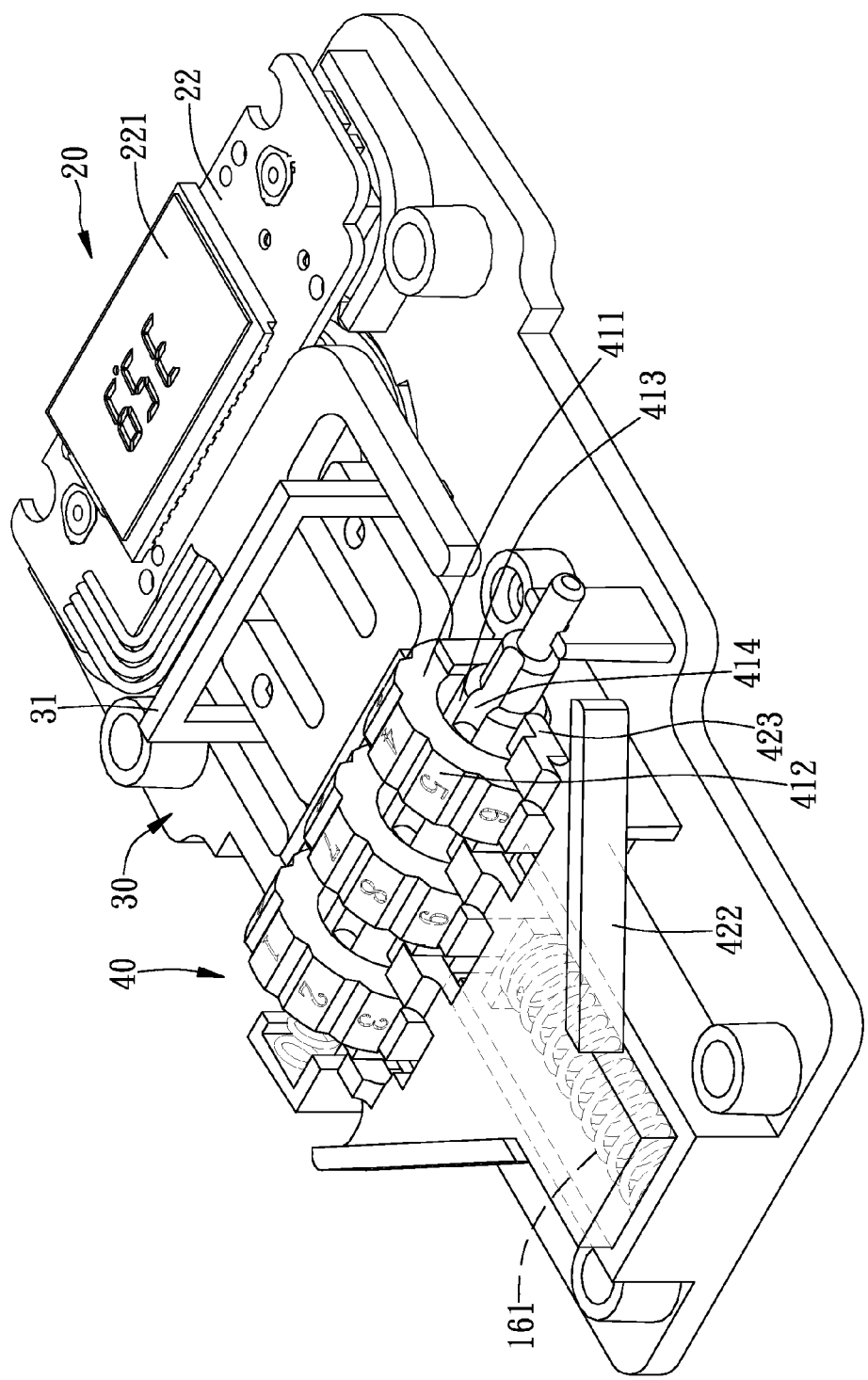
FIG. 5 is a partially perspective view of the suitcase scale in accordance with the present invention.

When using the suitcase scale in accordance with the present invention to scale the total weight of the suitcase (A) and lock the suitcase (A), with reference to FIGS. 1, 2 and 5, the total length of the strap (60) is adjusted according to a perimeter of the suitcase (A) and the strap (60) is bundled at the suitcase (A). The two resilient plates (52) with the two enlarged heads (53) is inserted into the tunnel (11) in the housing (10) and make the two enlarged heads (53) respectively engaged to the two through holes (12) such that the two second guide planes (531) respectively abut the two first guide planes (422). Finally, the rotors (411) are respectively and unconditionally rotated and make the combination lock (40) be in a locked condition when the protrusions (423) and the grooves (414) are arranged out of alignment. The tensile force from the strap (60) does not affect the weight sensor (30) when bundling the suitcase (A) because the two opposite ends of the strap (60) are respectively connected to the second end of the housing (10) and the buckle (50). As a result, the weight sensor (30) can accurately measure the total weight of the suitcase (A) and the use life of the weight sensor (30) is lengthened. The gravity of the suitcase (A) affects on the weight sensor (30) via the connector (32) when the suitcase (A) is carried above the ground. The weight sensor (30) sends a signal to the processing unit (20) according to the gravity that it senses. The processing unit (20) computes the signal and forms a digital signal shown on the displayer (221) such that the operator can read the weight data of the bundled suitcase (A) through the window (231). In addition, the processing unit (20) remembers the maximum value of the gravity of the suitcase (A) during carrying the suitcase (A) and the maximum value is flickeringly shown on the displayer (221) when the suitcase (A) is put on the ground.

As described above, the protrusions (423) and the grooves (414) are arranged out of alignment such that the free end of each of the protrusions (423) abuts a periphery of the corresponding shaft (413), and the first guide planes (422) and the second guide plane (531) abut each other. Consequently, the two enlarged head (53) can not be inwardly pressed and disengaged from the housing (10) because the latch (42) does not moved toward the lock core (42). As a result, the suitcase scale in accordance with the present invention provides an additional function of anti-theft to the suitcase (A).

Figure 3:
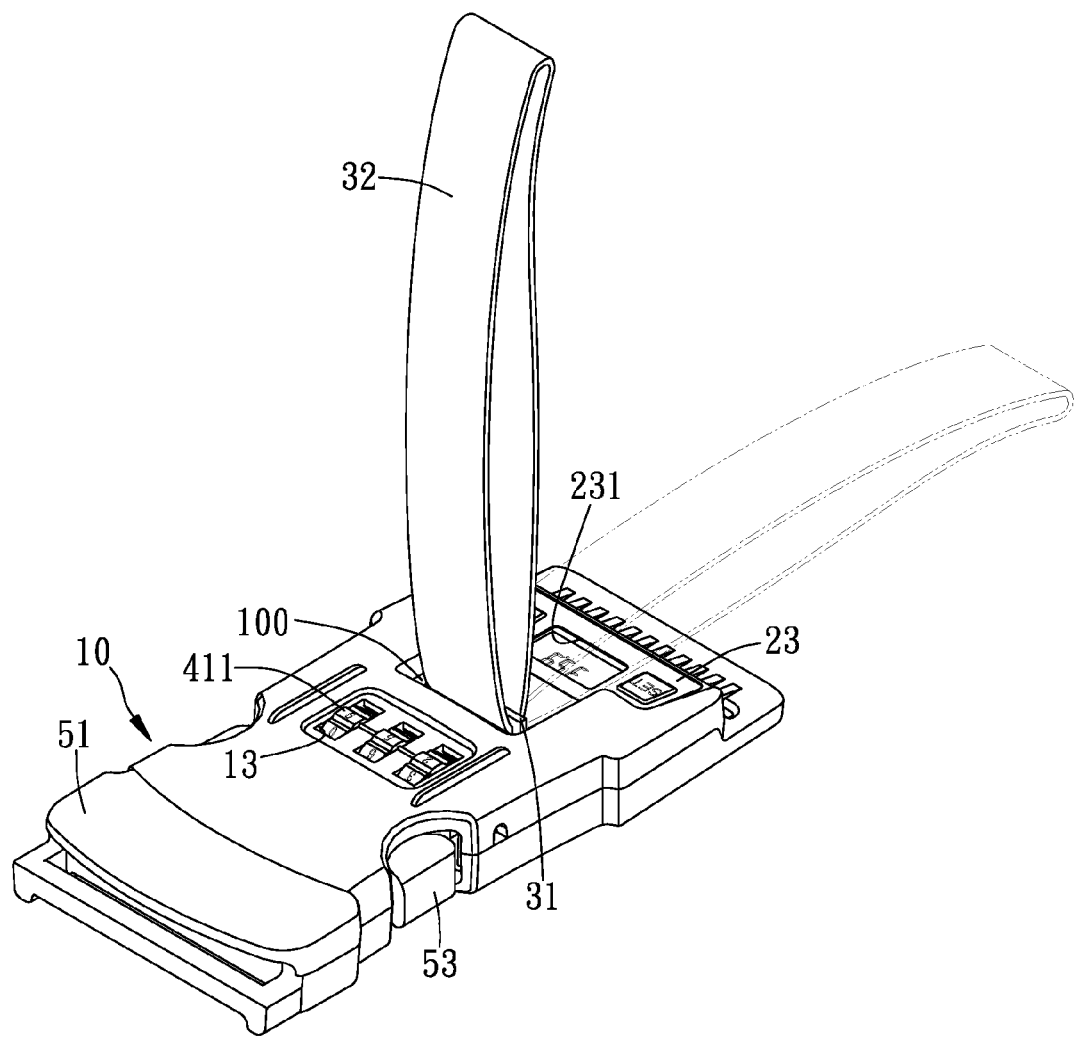
FIG. 3 is a perspective view of the suitcase scale in accordance with the present invention except the strap.

With reference to FIGS. 1 and 3, the tab (32) of the present invention is a textile such that the tab (32) is naturally lowered due to the gravity thereof such that the displayer (221) and the cover (23) are covered by the lowered tab (32). As a result, the lowered tab (32) provides a protection to the window (231) and the displayer (221). In addition, the cover (23) is mounted onto the bottom of the recess (100) to prevent the cover (23) from a direct impact such that the displayer (221) has a well protection.

Figure 4:
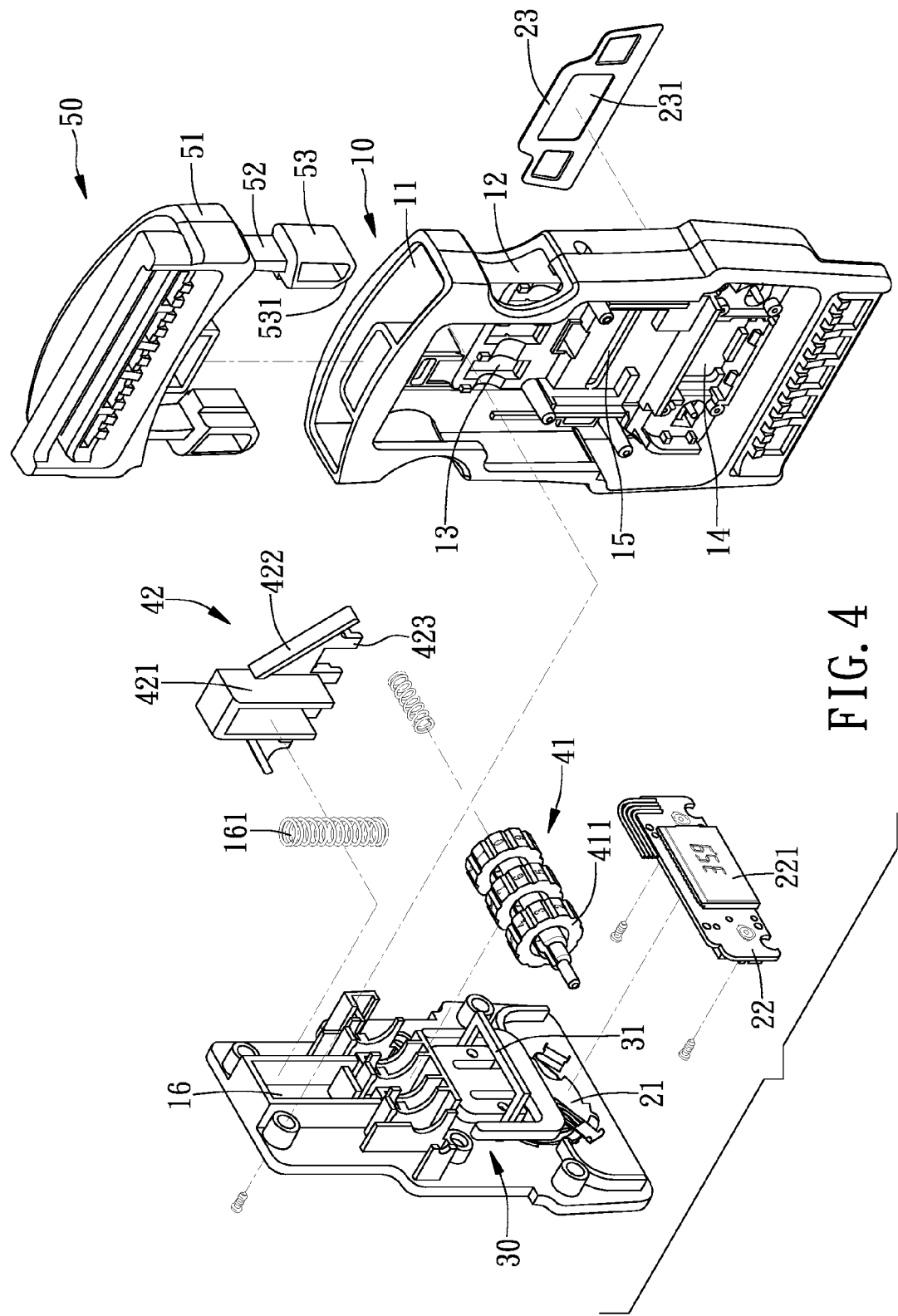
FIG. 4 is an exploded perspective view of the suitcase scale in FIG. 3.
Figure 6:
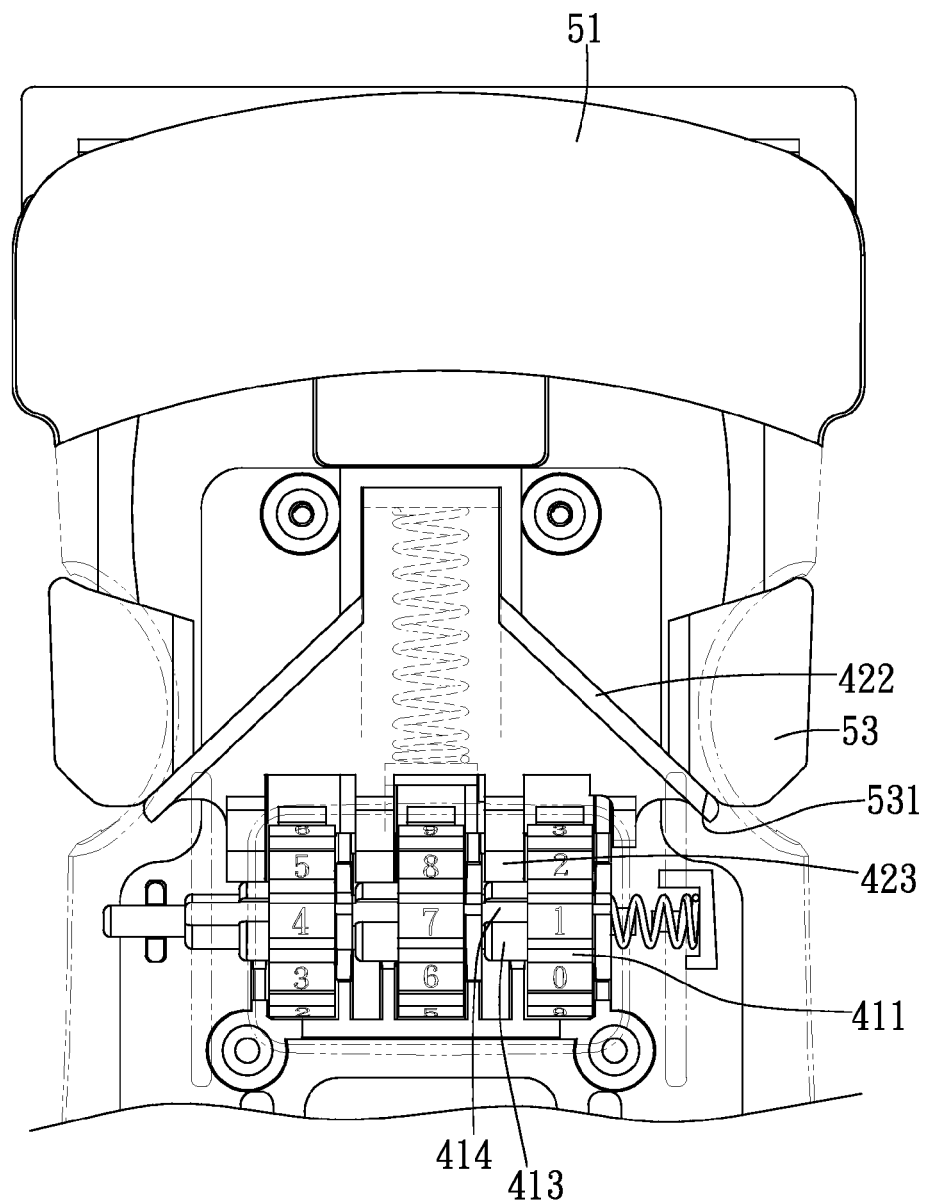
FIG. 6 is a partial top plan view of the suitcase scale in accordance with the present invention.
Figure 7:
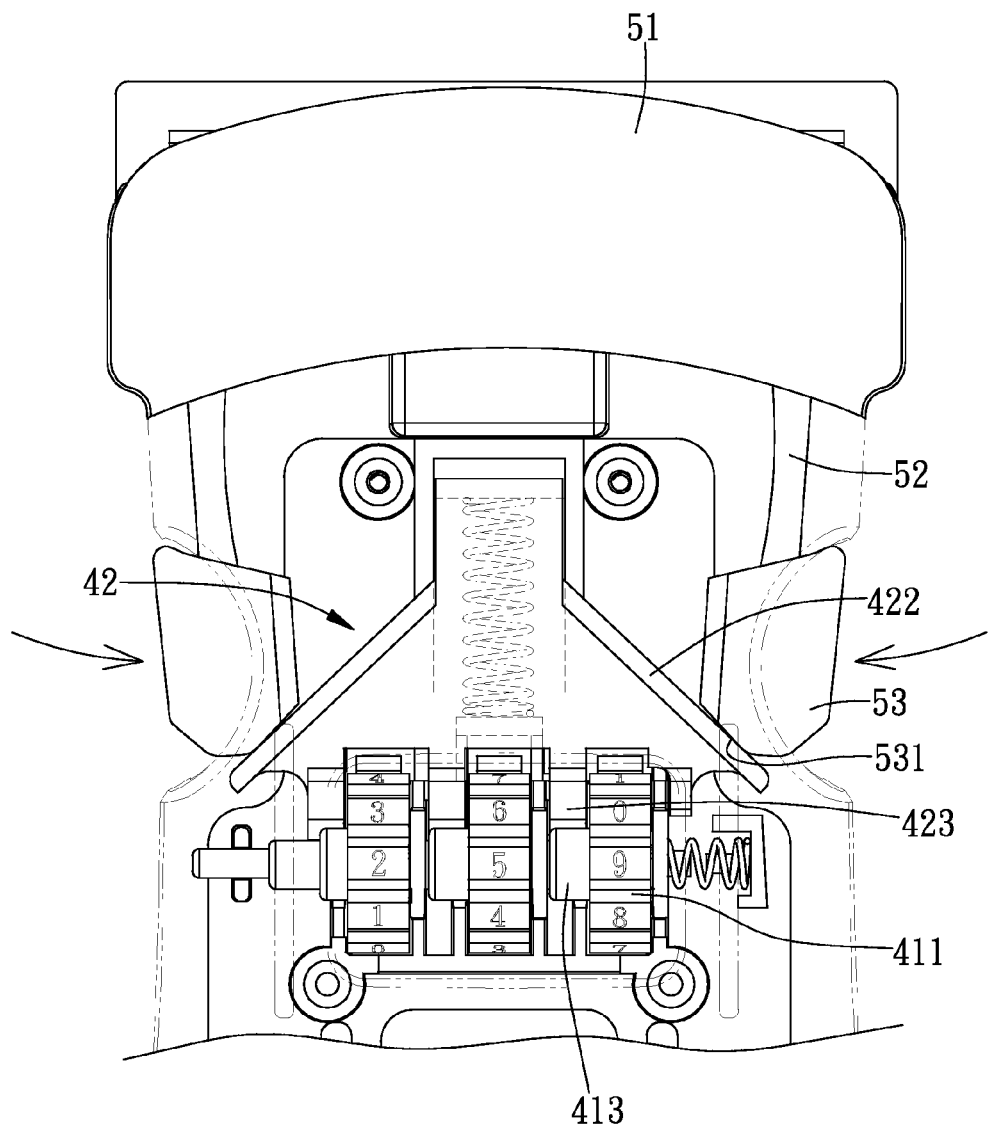
FIG. 7 is a first operational view of the suitcase scale in accordance with the present invention.
Figure 8:
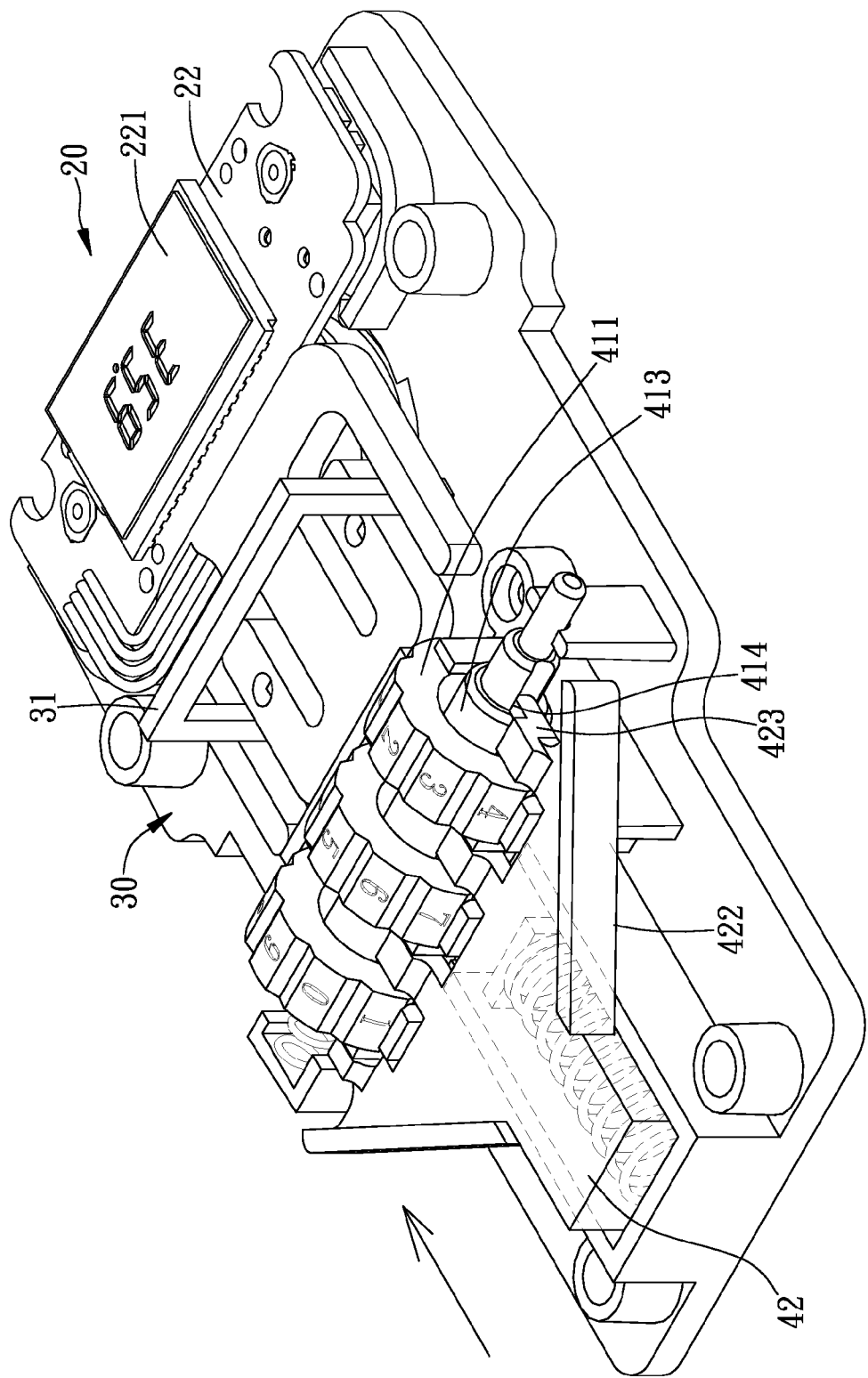
FIG. 8 is a second operational view of the suitcase scale in accordance with the present invention.

When unlocking the combination lock (40) and detaching the buckle (50) from the housing (10), with reference to FIGS. 4, 6, and 7, the rotors (411) are respectively rotated according to the password and make each protrusion (423) aligning with a corresponding one of the grooves (414). The latch (42) is moves toward the lock core (41) and the free end of each of the protrusions (423) is received in the corresponding groove (414) due to the abut first guide plane (422) and second guide plane (531) when the two enlarged heads (53) is pressed and inwardly moved relative to the housing (10). As a result, the two enlarged heads (53) are respectively disengaged from the two through holes (12) in the housing (10) such that the buckle (50) can be detached from the housing (10). Finally, the rotors (411) are respectively rotated to prevent the pass words from getting out.

As described above, the suitcase scale in accordance with the present invention immediately shows the total weight value of the suitcase (A) to prevent the user from paying and excessive baggage charge and provides a function of anti-theft due to the combination lock (40) such that a thief or a pickpocket can not steal the belongings in the locked suitcase (A).

Although the invention has been explained in relation to its preferred embodiment, it is to be understood that many other possible modifications and variations can be made without departing from the spirit and scope of the invention as hereinafter claimed.

What is claimed is:

1. A suitcase scale comprising:
   a hollow cuboid housing having a first end and a second end, a tunnel longitudinally defined in the first end, a recess defined in a panel of the housing near the second end, a trough and a slot respectively defined in to two opposite sides of the recess;
   a processing unit disposed in the housing, the processing unit including a battery secured on a bottom of the housing, a circuit board secured in the housing and electrically connected to the battery, a displayer mounted onto the circuit board and received in the trough, a cover mounted onto the bottom of the recess for covering the displayer, a window defined in the cover such that the user can read the datum shown on the display through the window;
   a weight sensor secured in the housing and electrically connected to the processing unit, the weight sensor including a connector extending through the slot and a tab connected to the connector, wherein the tab provides a protection to the window and the displayer when being lowered;
   a buckle detachably engaged into the housing; and
   a strap having two opposite ends respectively connected to the buckle and the second end of the housing.

2. The suitcase scale as claimed in claim 1, wherein the housing includes multiple longitudinal grooves defined in the panel of the housing.

3. The suitcase scale as claimed in claim 2 further comprising a combination lock received in the housing, the combination lock including a lock core rotatably mounted onto the bottom of the housing and a latch slidably mounted onto the bottom of the housing, the lock core including multiple rotors sequentially co-axially and rotatably connected to one another and each rotor partially extending through a corresponding one of the longitudinal grooves for user to easily rotate the rotors.

4. The suitcase scale as claimed in claim 3, wherein each rotor has multiple indicating zones peripherally formed thereon, each indicating zone marked a number and the numbers being different from one another, each rotor including a shaft centrally extending therefrom, a groove radially defined in the shaft of each of the rotors, wherein each groove corresponds to a number.

5. The suitcase scale as claimed in claim 4, wherein the latch includes two opposite sides each having a tapered first guide plane formed thereon, multiple protrusions extending from a distal edge of the latch toward the lock core and each protrusion radially points to a corresponding one of the shaft, a distal end of each of the protrusions selectively received in the groove in the corresponding shaft.

6. The suitcase scale as claimed in claim 5, wherein the housing includes two through holes respectively defined in two opposite sides of the housing and communicating with the tunnel.

7. The suitcase scale as claimed in claim 6, wherein the buckle is formed with a handle selectively abutting against the first end of the housing, two parallel resilient plates respectively extending from one side of the handle, an enlarged head formed on a free end of each of the two resilient plates, each enlarged head engaged to a corresponding one of the two through holes after being inserted into the tunnel such that the buckle does not detach from the housing, each enlarged head formed with a tapered second guide plane, each second guide plane abutting a corresponding one of the two first guide plane.

8. The suitcase scale as claimed in claim 3, wherein the housing includes a longitudinal trough defined in the bottom thereof near the first end of the housing and a spring compressively received in the longitudinal trough, and the latch is formed with a slider slidably received in the longitudinal trough, one end of the slider abutting against the spring such that the latch is reciprocally moved relative to the housing and the spring pushes the latch toward the first end of the housing when the latch is in a free condition.

9. The suitcase scale as claimed in claim 4, wherein the housing includes a longitudinal trough defined in the bottom thereof near the first end of the housing and a spring compressively received in the longitudinal trough, and the latch is formed with a slider slidably received in the longitudinal trough, one end of the slider abutting against the spring such that the latch is reciprocally moved relative to the housing and the spring pushes the latch toward the first end of the housing when the latch is in a free condition.

10. The suitcase scale as claimed in claim 5, wherein the housing includes a longitudinal trough defined in the bottom thereof near the first end of the housing and a spring compressively received in the longitudinal trough, and the latch is formed with a slider slidably received in the longitudinal trough, one end of the slider abutting against the spring such that the latch is reciprocally moved relative to the housing and the spring pushes the latch toward the first end of the housing when the latch is in a free condition.

11. The suitcase scale as claimed in claim 6, wherein the housing includes a longitudinal trough defined in the bottom thereof near the first end of the housing and a spring compressively received in the longitudinal trough, and the latch is formed with a slider slidably received in the longitudinal trough, one end of the slider abutting against the spring such that the latch is reciprocally moved relative to the housing and the spring pushes the latch toward the first end of the housing when the latch is in a free condition.

12. The suitcase scale as claimed in claim 7, wherein the housing includes a longitudinal trough defined in the bottom thereof near the first end of the housing and a spring compressively received in the longitudinal trough, and the latch is formed with a slider slidably received in the longitudinal trough, one end of the slider abutting against the spring such that the latch is reciprocally moved relative to the housing and the spring pushes the latch toward the first end of the housing when the latch is in a free condition.

\* \* \* \* \*